(12) United States Patent
Park et al.

(10) Patent No.: US 8,885,454 B2
(45) Date of Patent: Nov. 11, 2014

(54) APPARATUS AND METHOD FOR PRECODING USING CHANNEL ORTHOGONALIZATION IN MULTI-USER MULTI-ANTENNA SYSTEM

(75) Inventors: Sung-Woo Park, Yongin-si (KR); In-Seok Hwang, Seoul (KR); InKyu Lee, Seoul (KR); Jin-Sung Kim, Mungyeong-si (KR); Chung-Gu Kang, Seoul (KR); Jun Heo, Seoul (KR)

(73) Assignees: Samsung Electronics Co., Ltd., Suwon-si (KR); Korea University Research and Business Foundation, Seoul (KR)

( * ) Notice: Subject to any disclaimer, the term of this patent is extended or adjusted under 35 U.S.C. 154(b) by 559 days.

(21) Appl. No.: 13/182,697

(22) Filed: Jul. 14, 2011

(65) Prior Publication Data

US 2012/0020200 A1    Jan. 26, 2012

(30) Foreign Application Priority Data

Jul. 20, 2010    (KR) .................. 10-2010-0069798

(51) Int. Cl.
| | | |
|---|---|---|
| *H04J 11/00* | (2006.01) | |
| *H04B 7/04* | (2006.01) | |
| *H04L 25/02* | (2006.01) | |
| *H04L 25/03* | (2006.01) | |
| *H04L 5/00* | (2006.01) | |

(52) U.S. Cl.
CPC .......... *H04B 7/0473* (2013.01); *H04L 25/0248* (2013.01); *H04L 25/03891* (2013.01); *H04L 5/0023* (2013.01)
USPC ...................................... 370/203

(58) Field of Classification Search
CPC ....... H04L 27/206; H04L 5/0007; H04J 11/00
See application file for complete search history.

(56) References Cited

U.S. PATENT DOCUMENTS

| | | | | |
|---|---|---|---|---|
| 7,809,074 | B2 * | 10/2010 | Kotecha et al. | 375/267 |
| 8,229,017 | B1 * | 7/2012 | Lee et al. | 375/267 |
| 8,306,089 | B2 * | 11/2012 | Merlin et al. | 375/135 |
| 8,351,524 | B2 * | 1/2013 | Zhou | 375/260 |
| 2007/0086543 | A1 * | 4/2007 | David et al. | 375/299 |
| 2007/0291868 | A1 * | 12/2007 | Olesen et al. | 375/267 |
| 2008/0037675 | A1 * | 2/2008 | Lin et al. | 375/262 |
| 2008/0049709 | A1 * | 2/2008 | Pan et al. | 370/344 |
| 2008/0075058 | A1 * | 3/2008 | Mundarath et al. | 370/342 |
| 2008/0080459 | A1 * | 4/2008 | Kotecha et al. | 370/342 |
| 2008/0108310 | A1 * | 5/2008 | Tong et al. | 455/69 |
| 2008/0170533 | A1 * | 7/2008 | Cyzs et al. | 370/315 |
| 2008/0219376 | A1 * | 9/2008 | Qi et al. | 375/285 |
| 2009/0285325 | A1 * | 11/2009 | Zhou | 375/267 |
| 2010/0054355 | A1 * | 3/2010 | Kinjo et al. | 375/262 |
| 2010/0232352 | A1 * | 9/2010 | Merlin et al. | 370/328 |

(Continued)

*Primary Examiner* — Robert C Scheibel
*Assistant Examiner* — Prenell Jones
(74) *Attorney, Agent, or Firm* — Jefferson IP Law, LLP (57) ABSTRACT

An apparatus and method for transmitting in a multi-user multi-antenna system are provided. The apparatus includes a precoder for orthogonalizing a channel by removing a channel element of a corresponding terminal with respect to multiple terminals, for determining an effective channel of each terminal by decomposing the orthogonalized channel using Singular Value Decomposition (SVD), for determining a precoding matrix using the effective channel, and for mapping data streams of the multiple terminals to a plurality of transmit antennas using the precoding matrix, and the plurality of the transmit antennas for transmitting the data streams of the multiple terminals. Hence, it is possible to obtain an iteration algorithm performance requiring considerable computation while avoiding complexity and reducing computation.

22 Claims, 7 Drawing Sheets

(56) References Cited

U.S. PATENT DOCUMENTS

| | | |
|---|---|---|
| 2010/0238912 A1* | 9/2010 | Merlin et al. .................. 370/338 |
| 2010/0248729 A1* | 9/2010 | Yu et al. ........................ 455/450 |
| 2010/0284484 A1* | 11/2010 | Jongren et al. ................ 375/267 |
| 2010/0310001 A1* | 12/2010 | Yeh et al. ...................... 375/267 |
| 2011/0028108 A1* | 2/2011 | Lin et al. ..................... 455/114.2 |
| 2011/0075752 A1* | 3/2011 | Zheng et al. .................. 375/267 |
| 2011/0176633 A1* | 7/2011 | Ojard et al. ................... 375/295 |
| 2011/0261894 A1* | 10/2011 | Yu et al. ........................ 375/267 |
| 2011/0319027 A1* | 12/2011 | Sayana et al. ............... 455/67.11 |
| 2012/0051257 A1* | 3/2012 | Kim et al. ..................... 370/252 |
| 2012/0069833 A1* | 3/2012 | Molnar ......................... 370/342 |
| 2012/0076033 A1* | 3/2012 | Mundarath et al. ........... 370/252 |
| 2012/0093253 A1* | 4/2012 | Park et al. ..................... 375/285 |
| 2012/0140851 A1* | 6/2012 | Zhang et al. .................. 375/296 |
| 2013/0058426 A1* | 3/2013 | Porat et al. .................... 375/267 |

* cited by examiner

APPARATUS AND METHOD FOR PRECODING USING CHANNEL ORTHOGONALIZATION IN MULTI-USER MULTI-ANTENNA SYSTEM

PRIORITY

This application claims the benefit under 35 U.S.C. §119(a) of a Korean patent application filed in the Korean Intellectual Property Office on Jul. 20, 2010, and assigned Serial No. 10-2010-0069798, the entire disclosure of which is hereby incorporated by reference.

BACKGROUND OF THE INVENTION

1. Field of the Invention

The present invention relates to a multi-antenna system. More particularly, the present invention relates to a method and an apparatus for iteration reduction when precoding to transmit downlink data to two or more users in the multi-antenna system.

2. Description of the Related Art

Research is ongoing to provide various multimedia services including a voice service in a wireless communication environment and to support high-quality and high-speed data communication. A part of the research focuses on a Multiple Input Multiple Output (MIMO) system using a spatial channel. The MIMO technology can offer a high data rate by increasing channel capacity within limited frequency resources using multiple antennas at both a transmitter and a receiver.

In the MIMO environment, representative examples of a linear beamforming technique for multiple users include a Channel Inversion (CI) scheme, a Block Diagonalization (BD) scheme, and the like. However, disadvantageously, the BD scheme uses a great number of transmit antennas at a base station. To address this issue, additional approaches, such as antenna selection or eigenmode selection, are needed.

Unlike the BD scheme, a Coordinated BeamForming (CBF) scheme can transmit data streams smaller than the number of receive antennas of each user to each user. Hence, the CBF can transmit data to multiple users with higher performance under various antenna conditions.

Disadvantageously, the schemes of the related art are considerably complex in their iterative optimization, and are scarcely adopted in practice because the number of the iterations varies per channel realization. In addition, additional analysis is required to determine whether the result of the iteration is always converged regardless of the channel state.

To avoid the iteration, the CBF scheme uses the generalized eigenvector of a postcoding vector. However, the CBF scheme degrades the performance when the number of antennas is greater than a certain number. Practically, it is difficult to apply the CBF scheme in a typical communication system including multiple users and multiple antennas.

As discussed above, the continuous iterative optimization of the schemes of the related art involves a great deal of complexity and a different complexity per channel realization, and thus it is difficult to adopt the schemes of the related art in a real world system.

Hence, what is needed is a precoding method that is less complex and uses constant computations at all times.

SUMMARY OF THE INVENTION

Aspects of the present invention are to address at least the above-mentioned problems and/or disadvantages and to provide at least the advantages described below. Accordingly, an aspect of the present invention is to provide a method and an apparatus for precoding using channel orthogonalization in a multi-user multi-antenna system.

Another aspect of the present invention is to provide a method and an apparatus for reducing computations of precoding in a multi-user multi-antenna system.

In accordance with an aspect of the present invention, an apparatus for transmitting in a multi-user multi-antenna system is provided. The apparatus includes a precoder for orthogonalizing a channel by removing a channel element of a corresponding terminal with respect to multiple terminals, for determining an effective channel of each terminal by decomposing the orthogonalized channel using Singular Value Decomposition (SVD), for determining a precoding matrix using the effective channel, and for mapping data streams of the multiple terminals to a plurality of transmit antennas using the precoding matrix, and the plurality of the transmit antennas for transmitting the data streams of the multiple terminals.

In accordance with another aspect of the present invention, a method for transmitting in a multi-user multi-antenna system is provided. The method includes orthogonalizing a channel by removing a channel element of a corresponding terminal with respect to multiple terminals, determining an effective channel of each terminal by decomposing the orthogonalized channel using SVD, determining a precoding matrix using the effective channel, mapping data streams of the multiple terminals to a plurality of transmit antennas using the precoding matrix, and transmitting the data streams of the multiple terminals.

In accordance with yet another aspect of the present invention, an apparatus for receiving in a multi-user multi-antenna system is provided. The apparatus includes a plurality of receive antennas for receiving data streams of multiple terminals, and a postcoder for orthogonalizing a channel by removing a channel element of a corresponding terminal with respect to the multiple terminals, for determining an effective channel of each terminal by decomposing the orthogonalized channel using SVD, for determining a postcoding matrix using the effective channel, and for dividing data streams of the multiple terminals using the postcoding matrix.

In accordance with still another aspect of the present invention, a method for receiving in a multi-user multi-antenna system is provided. The method includes receiving data streams of multiple terminals, orthogonalizing a channel by removing a channel element of a corresponding terminal with respect to the multiple terminals, determining an effective channel of each terminal by decomposing the orthogonalized channel using SVD, determining a postcoding matrix using the effective channel, and dividing data streams of the multiple terminals using the postcoding matrix.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention provide a method and an apparatus for precoding using channel orthogonalization in a multi-user multi-antenna system. More particularly, when precoding to transmit downlink data for two or more users, the precoding method and apparatus require less complexity and less computation by performing one iteration after channel orthogonalization.

Figure 1:
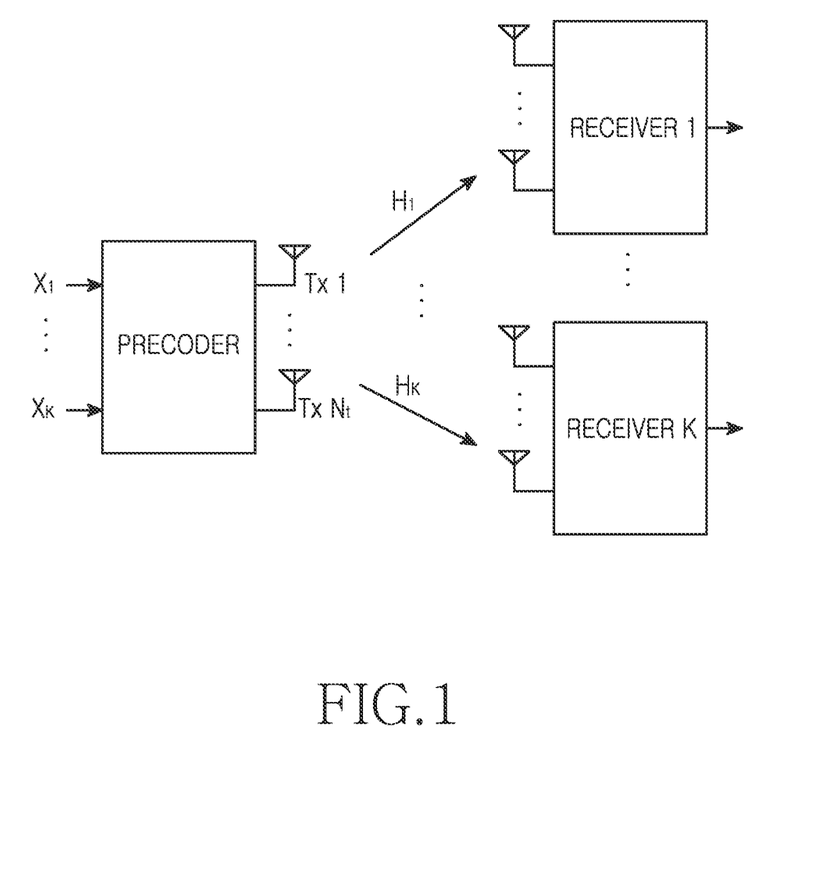
FIG. 1 is a diagram of a multi-user multi-antenna system according to an exemplary embodiment of the present invention.

FIG. 1 illustrates a multi-user multi-antenna system according to an exemplary embodiment of the present invention.

Referring to FIG. 1, a transmitter (or a base station) includes a precoder and $N_t$-ary antennas. K-ary receivers each including $N_r$-ary antennas receive $N_s$-ary ($N_s < N_r$) data streams. The precoder precodes a complex vector to send to the receivers using a precoding matrix $T=[T_1 \ldots T_K]$ and transmits the precoded complex vector to two or more receivers over the $N_t$-ary antennas. That is, the precoder maps the data streams of the multiple users to the multiple transmit antennas.

For the precoding requiring less complexity and less computation, the precoder determines an effective channel by channel-orthogonalizing a channel matrix with respect to a plurality of user terminals and determines a precoding matrix using the effective channel.

That is, the precoder determines the channel matrix for each of the user terminals, determines an orthogonal channel matrix using the channel matrixes of the user terminals, decomposes the orthogonal channel matrixes to a first unitary matrix, a diagonal matrix, and a second unitary matrix by performing Singular Value Decomposition (SVD) with respect to the orthogonal channel matrixes of the multiple user terminals, and determines a first effective channel of each user terminal using the second unitary matrix of the multiple user terminals.

The precoder determines the precoding matrix using the first effective channel, determines a first precoding matrix based on the first effective channel of the multiple user terminals, determines a postcoding vector using the first precoding matrix, determines a second effective channel of the multiple user terminals using the postcoding vector, and determines a second precoding matrix of the multiple user terminals based on the second effective channel.

Each receiver (or terminal) receives the transmit signal from the transmitter and outputs the independent transmit signal by multiplying the transmit signal by the different postcoding matrix $R_k$.

More specifically, the receive signal vector of each user is given by Equation 1.

$$w_k = R_k^* y_k = R_k^* H_k T_k x_k + R_k^* H_k \sum_{i=1, i \neq k}^{K} T_i x_i + R_k^* n_k \quad (1)$$

In Equation (1), $x_i$ denotes a data signal vector of each user, $T_i$ denotes the precoding matrix corresponding to the i-th user, $H_k$ denotes a channel response matrix of each user, $n_k$ denotes a noise vector, and $y_k$ denotes a receive signal vector. The symbol * denotes a conjugate transpose.

Figure 2:
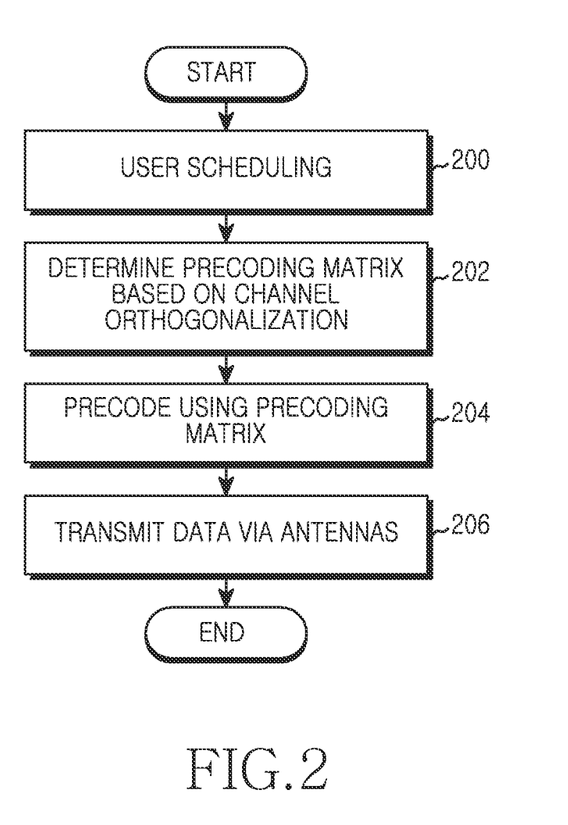
FIG. 2 is a flowchart of a method for transmitting data in a multi-user multi-antenna system according to an exemplary embodiment of the present invention.

FIG. 2 illustrates a method for transmitting data in a multi-user multi-antenna system according to an exemplary embodiment of the present invention.

Referring to FIG. 2, the transmitter performs user scheduling in step 200. The user scheduling is well known in the art and thus shall not be explained in detail herein for conciseness in explanation.

In step 202, the transmitter determines the precoding matrix based on the channel orthogonalization with respect to the user terminals as determined through the user scheduling. The determination of the precoding matrix shall be described further below with reference to FIG. 3.

In step 204, the transmitter precodes using the precoding matrix of the multiple user terminals.

In step 206, the transmitter sends the precoded data of the multiple user terminals over the multiple antennas.

Figure 3:
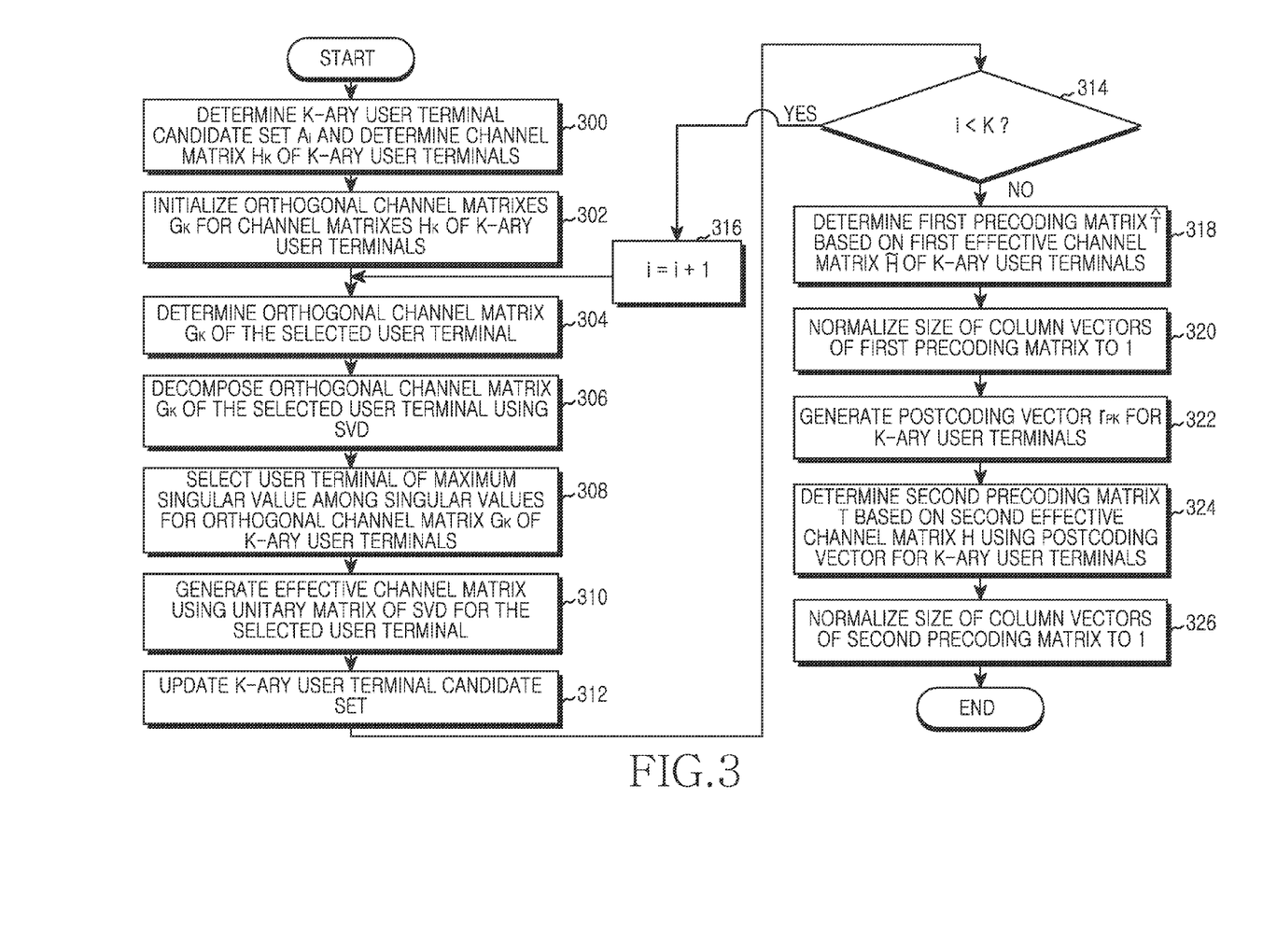
FIG. 3 is a flowchart of a precoding method in a multi-user multi-antenna system according to an exemplary embodiment of the present invention.

FIG. 3 illustrates a precoding method in a multi-user multi-antenna system according to an exemplary embodiment of the present invention.

Referring to FIG. 3, in step 300, the transmitter determines K-ary user terminal candidate set $A_1 = \{1, \ldots, K\}$ for the user terminal to be selected first (i=1), and determines the channel matrixes $H_k$ of the K-ary user terminals belonging to the candidate set $A_1$ based on the channel estimation. The K-ary user terminal candidate set $A_1=\{1, \ldots, K\}$ is determined through the user scheduling. Herein, i denotes an order of selecting the user terminal.

In step 302, the transmitter initializes orthogonal channel matrixes $G_k$ for the channel matrixes $H_k$ of the K-ary user terminals. Herein, k (=1, ..., K) denotes an index of the user terminal. That is, initially (i.e., i=1), the transmitter sets the orthogonal channel matrix $G_k$ to the channel matrix $H_k$ with respect to the channel matrixes $H_k$ of the K-ary user terminals, based on Equation 2.

$$G_k = H_k(\forall k) \tag{2}$$

In Equation (2), $\forall k$ denotes every k value.

In step 304, the transmitter determines the orthogonal channel matrix $G_k$ of the selected user terminal. That is, when i=1, the orthogonal channel matrix $G_k$ of every user terminal (1, ..., K) of the user terminal candidate set $A_1$ is determined as the channel matrix $H_k$.

When i=2, ..., K, the orthogonal channel matrix $G_k$ of the user terminal candidate set $A_i=\{k|k\in A_i-1, k\neq p_i-1\}$ is determined based on Equation 3. $A_2$ determines $G_k$ for K-1-ary user terminals excluding the first selected user terminal $p_1$ in the candidate set $A_1$. $A_3$ determines $G_k$ for K-2-ary user terminals excluding the first and second selected user terminals $p_1$ and $p_2$ in the candidate set $A_2$. $A_K$ determines $G_k$ for the one remaining user terminal excluding the K-1-ary selected user terminals $p_1$ through $p_K$-1 in the candidate set $A_{K-1}$.

$$G_k = H_k \left( I - \sum_{m=1}^{i-1} v_{p_m,1} v_{p_m,1}^* \right) \tag{3}$$

In Equation (3), I denotes the unitary matrix, $H_k$ denotes the channel matrix of the k-th terminal, and $v_{p_m,1}$ denotes the first column vector of the second unitary matrix according to the SVD on $G_k$ of the selected user terminal Namely, Equation 3 signifies that the channel element of the previously selected user terminal is removed.

Meanwhile, Equation 3 assumes that one user terminal has one data stream. If one user terminal transmits two or more data streams, one stream is allocated to the K-ary user terminals and then the orthogonal channel matrix $G_k$ for one stream per K-ary user terminal is determined in the same manner based on Equation (4).

$$G_k = \left( I - \sum_{n=1}^{j-1} \sum_{m=1}^{K} v_{p_m,n} v_{p_m,n}^H - \sum_{m=1}^{i-1} v_{p_m,i} v_{p_m,i}^H \right) H_k \tag{4}$$

In Equation (4), j denotes an index of the data stream to transmit per terminal, and i denotes the order of the user selection in the j-th data stream per terminal.

In step 306, the transmitter decomposes the orthogonal channel matrix $G_k$ of the selected user terminal using the SVD based on Equation 5.

$$G_k = [u_{k,1} \ldots] \sum_k [v_{k,1} \ldots]^* \tag{5}$$

In Equation (5), $u_{k,1}$ denotes the first column vector of the first unitary matrix, $$\sum_k$$

denotes the diagonal matrix, and $v_{k,1}$ denotes the first column vector of the second unitary matrix. That is, the orthogonal channel matrix $G_k$ is decomposed to two unitary matrixes and one diagonal matrix.

In step 308, the transmitter selects the user terminal of the maximum singular value among the singular values for the orthogonal channel matrix $G_k$ of the selected user terminal, which is expressed as Equation 6.

$$p_i = \underset{k \in A_i}{\operatorname{argmax}}(\sigma_{k,1} = \|u_{k,1}^* H_k\|) \tag{6}$$

In Equation (6), $p_i$ denotes the index of the i-th user terminal selected, $u_{k,1}$ denotes the first column vector of the first unitary matrix in the SVD, and $H_k$ denotes the channel matrix of the k-th user terminal.

In step 310, the transmitter generates an effective channel matrix $\tilde{H}$ using the first column vector $u_{k,1}$ of the first unitary matrix of the SVD for the selected user terminal, based on Equation 7.

$$\tilde{h}_i = u_{p_i,1}^* H_{p_i} \tag{7}$$

In Equation (7), $\tilde{h}_i$ denotes the effective channel of the i-th selected user terminal, $u_{p_i,1}$ denotes the first column vector of the first unitary matrix of the i-th selected user terminal, and $H_{p_i}$ denotes the channel matrix of the i-th user terminal.

In step 312, the transmitter updates the K-ary user terminal candidate set based on Equation 8.

$$A_i = \{k|k \in A_{i-1}, k \neq p_{i-1}\} \tag{8}$$

In Equation (8), i is 2, ..., K, the user terminal candidate set A2 includes K-1-ary user terminals excluding the first selected user terminal p1 in the candidate set A1, and the user terminal candidate set A3 includes K-2-ary user terminals excluding the first and second selected user terminals p1 and p2 in the candidate set A2. The last user terminal candidate set AK includes one remaining user terminal excluding the K-1-ary selected user terminals p1 through pK-1 in the candidate set $A_{K-1}$.

When i<K in step 314, the transmitter sets i=i+1 in step 316 and then returns to step 304.

By iterating step 304 through step 312 for K times, the first effective channel $\tilde{H} = [\tilde{h}_1^T \ldots \tilde{h}_1^T]$ is generated.

In contrast, when i≥K in step 314, the transmitter determines a first precoding matrix $\tilde{T}$ based on the first effective channel matrix $\tilde{H} = [\tilde{h}_1^T \ldots \tilde{h}_K^T]^T$ of the K-ary user terminals in step 318. The first precoding matrix $\tilde{T}$ is given by Equation 9.

$$\tilde{T} = \tilde{H}^*(\tilde{H}\tilde{H}^*)^{-1} \tag{9}$$

In step 320, the transmitter normalizes the size of the column vectors of the first precoding matrix to 1 based on Equation 10.

$$\hat{T} = \left[ \frac{\tilde{t}_1}{\|\tilde{t}_1\|} \cdots \frac{\tilde{t}_K}{\|\tilde{t}_K\|} \right] \text{ where } \tilde{T} = [\tilde{t}_1 \cdots \tilde{t}_K] \quad (10)$$

In step 322, the transmitter generates a postcoding vector $r_{p_k}$ for the K-ary user terminals using the first precoding matrix $\tilde{T}_k$ normalized and the channel matrix $H_{p_k}$ based on Equation 11.

$$r_{p_k}^* = H_{p_k} \tilde{T}_k \quad (11)$$

In step 324, the transmitter determines a second effective channel Z using the postcoding vector for the K-ary user terminals based on Equation 12, and determines a second precoding matrix T using the determined second effective channel Z based on Equation 13.

$$Z = \lfloor (r_1^* H_1)^T \cdots (r_K^* H_K)^T \rfloor \quad (12)$$

$$T = Z^* (ZZ^*)^{-1} \quad (13)$$

In step 326, the transmitter normalizes the size of the column vectors of the second precoding matrix based on Equation 14.

$$T_{Final} = \left[ \frac{t_1}{\|t_1\|} \cdots \frac{t_K}{\|t_K\|} \right] \text{ where } T = [t_1 \cdots t_K] \quad (14)$$

The method of FIG. 3 can be expressed with pseudo codes, an example of which is provided below.

1. Set $A_1 = \{1, \ldots, K\}$ and $G_k = H_k (\forall k)$
2. For i=1:K,
   Obtain $$G_k = H_k \left( I - \sum_{m=1}^{i-1} v_{p_m,1} v_{p_m,1}^* \right)$$

for $k \in A_i$
Apply SVD to $G_k = U_k \Sigma_k V_k^+$ $$p_i = \underset{k \in A_i}{\operatorname{argmax}} (\sigma_{k,1} = \|u_{k,1}^* H_k\|)$$

$$\tilde{h}_i = u_{p_i,1}^* H_{p_i}$$

Set $A_i = \{k | k \in A_{i-1}, k \neq p_{i-1}\}$
3. $\tilde{T} = \tilde{H}^* (\tilde{H}\tilde{H}^*)^{-1}$ and normalize $\tilde{T}$
4. $r_{p_k}^* = H_{p_k} \tilde{T}_k$
5. $Z = \lfloor (r_1^* H_1)^T \cdots (r_K^* H_K)^T \rfloor$
6. $T = Z^* (ZZ^*)^{-1}$ and normalize T When the computation complexity of the method of the related art and an exemplary embodiment of the present invention is compared, Table 1 shows the average number of the SVD operations in the exemplary embodiment of the present invention and the method of the related art. Unlike the method of the related art, it is easy to apply the exemplary embodiment of the present invention to a real world system because the average number of the SVD operations is independent of the number of the receive antennas $N_r$.

TABLE 1

| system environment | | $N_r = 2$ | $N_r = 3$ | $N_r = 4$ |
|---|---|---|---|---|
| $N_t = 4, K = 2$ | PROPOSED | | 3 | |
| | RELATED ART | 12.4 | 16.2 | 19 |
| $N_t = 6, K = 4$ | PROPOSED | | 10 | |
| | RELATED ART | 51.6 | 72.4 | 86.4 |

Table 2 represents the complexity of Table 1 with the number of multiplications actually required. Based on Table 2, the complexity of the exemplary embodiment of the present invention greatly reduces compared to the method of the related art. For example, when $N_t=4$ and K=2, the exemplary embodiment of the present invention reduces the complexity of 68%, 76% and 79% at $N_r=2, 3, 4$. Even when the number of the transmit antennas increases, the reduced complexity is maintained.

TABLE 2

| system environment | | Nr = 2 | Nr = 3 | Nr = 4 |
|---|---|---|---|---|
| Nt = 4, K = 2 | PROPOSED | 5388 | 7602 | 9816 |
| | RELATED ART | 16864 | 31104 | 47120 |
| Nt = 6, K = 4 | PROPOSED | 26120 | 36780 | 47440 |
| | RELATED ART | 70176 | 139008 | 214272 |

Herein, $N_t$ denotes the number of the transmit antennas, $N_r$ denotes the number of the receive antennas, and K denotes the number of the users.

Figure 4:
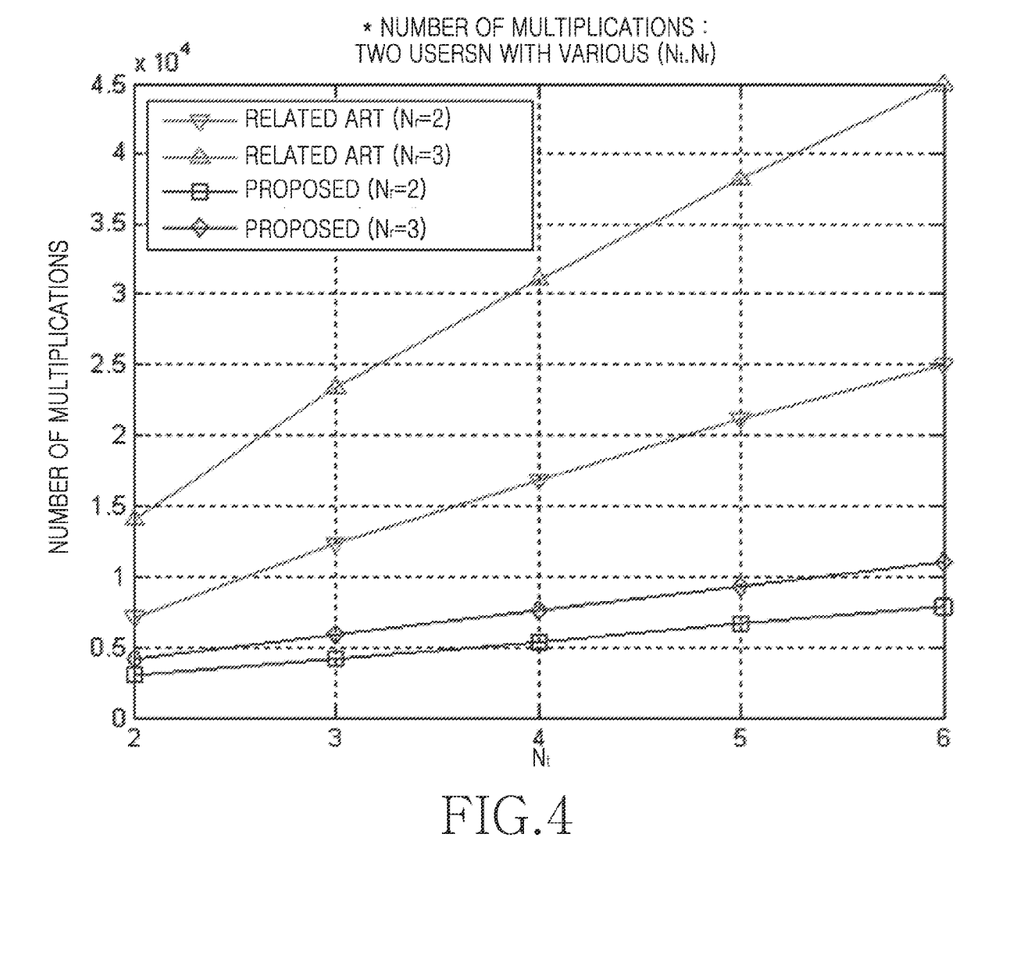
FIG. 4 is a graph for comparing complexity of an exemplary embodiment of the present invention and a method of the related art.

FIG. 4 is a graph for comparing complexity of an exemplary embodiment of the present invention and a method of the related art.

Referring to FIG. 4, when $N_t$ varies, the number of the required multiplications is compared between the method of the related art and an exemplary embodiment of the present invention. As $N_t$ increases, the exemplary embodiment of present invention greatly decreases complexity compared to the method of the related art. Unlike the method of the related art, the exemplary embodiment of present invention exhibits a low line of a constant slope according to the size of $N_t$ in the graph. Hence, the exemplary embodiment of present invention can attain far more gain than the method of the related art in terms of complexity.

Figure 5:
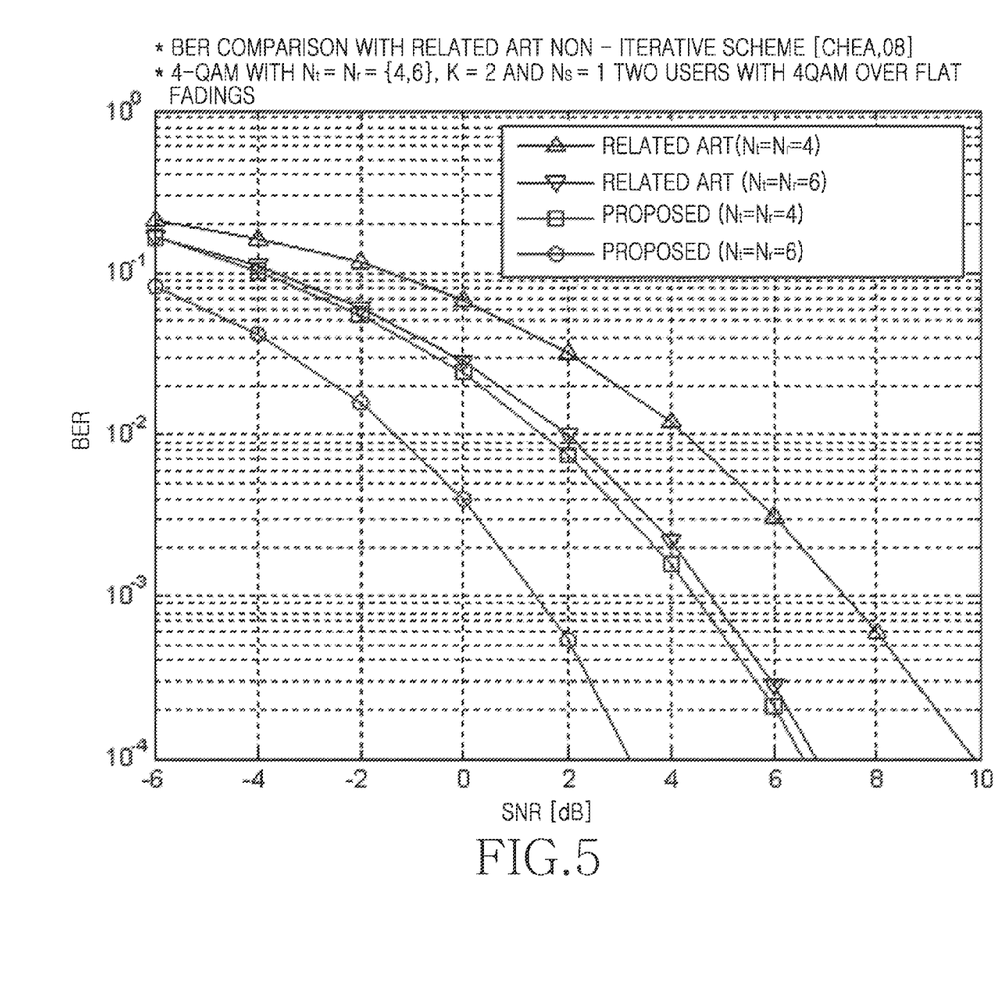
FIG. 5 is a graph for comparing a Bit Error Rate (BER) of an exemplary embodiment of the present invention and a method of the related art.

FIG. 5 is a graph for comparing a Bit Error Rate (BER) of an exemplary embodiment of the present invention and a method of the related. The method of the related art is described in the literature "C.-B. Chae, D. Mazzarese, N. Jindal, and R. W. Heath, "Coordinated Beamforming with Limited Feedback in the MIMO Broadcast Channel", IEEE Journal on Selected Areas in Communications, vol. 26, pp. 1505-1515, October 2008.

Referring to FIG. 5, in the simulation with 4-Quadrature Amplitude Modulation (QAM), flat fading channel, K=2, $N_t = N_r = \{4, 6\}$, and $N_s = 1$, the performance of the exemplary embodiment of present invention exhibits the performance gain of about 3.5 dB compared to the method of the related art.

Figure 6:
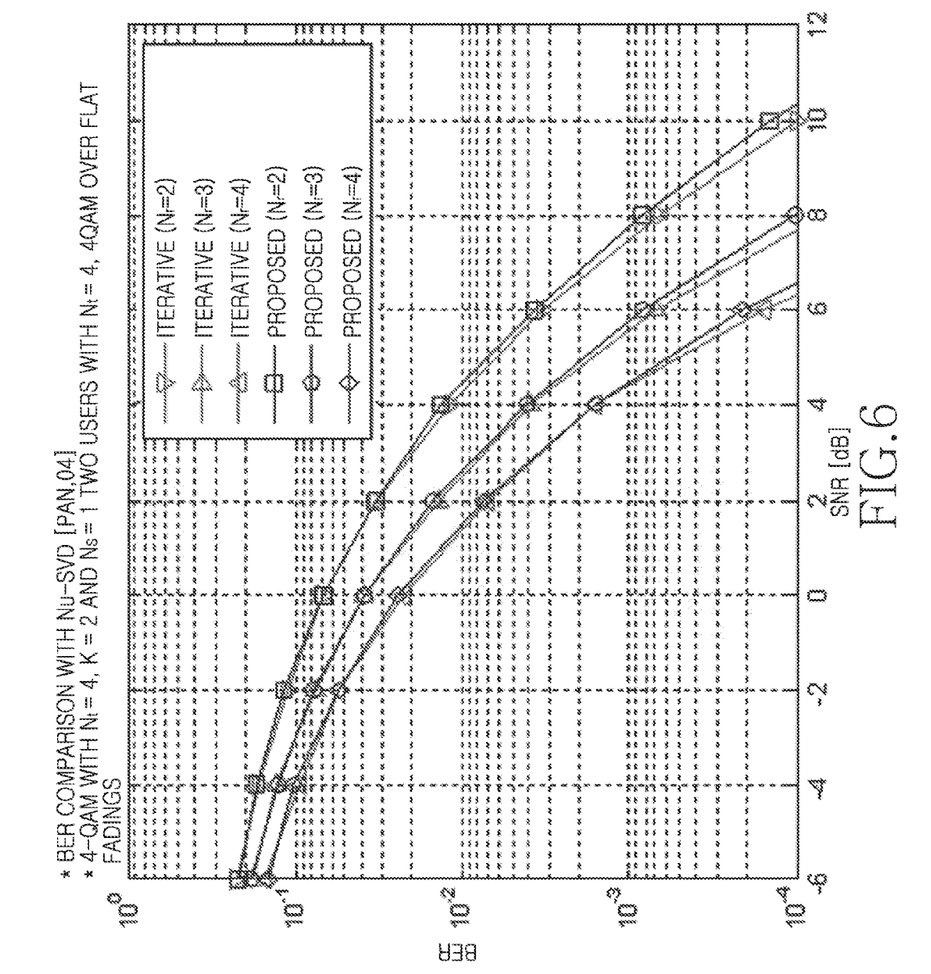
FIGS. 6 and 7 are graphs for comparing a BER of an exemplary embodiment of the present invention and a method of the related art.
Figure 7:
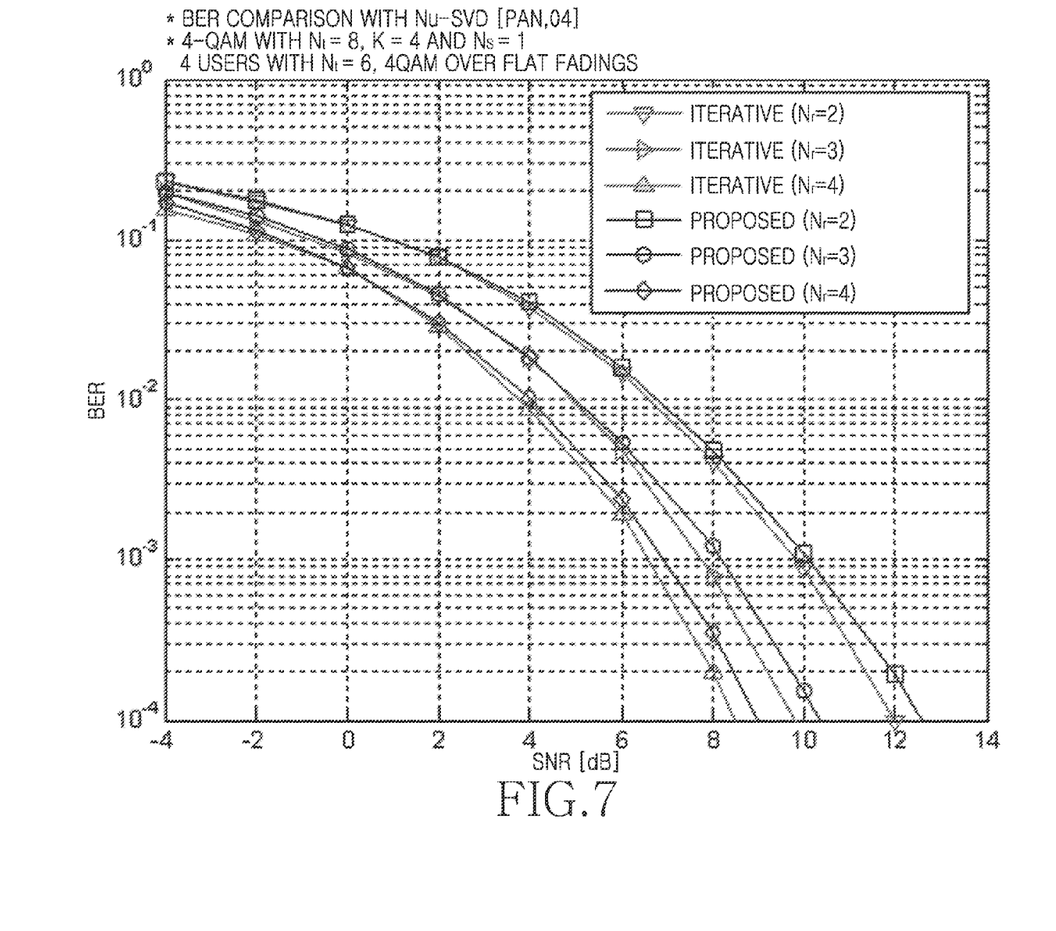

FIGS. 6 and 7 are graphs for comparing a BER of an exemplary embodiment of the present invention and a method of the related art.

The method of the related art of FIGS. 6 and 7 is described in the literature of Z. Pan, K.-K. Wong, and T.-S. Ng, "Generalized Multiuser Orthogonal Space-Division Multiplexing", IEEE Transactions on Wireless Communications, vol. 3, pp. 1969-1973, November 2004.

Referring to FIG. 6, in the simulation with 4-QAM, flat fading channel, $N_t=4$, $N_r=\{2, 3, 4\}$, and $N_s=1$, the performance of the exemplary embodiment of present invention exhibits lower complexity than the method of the related art and the same performance for almost every value. Herein, in the simulation of FIG. 6, the method of the related art of FIG. 5 is unavailable because of a lack of rank.

Referring to FIG. 7, in the simulation with 4-QAM, flat fading channel, $N_t=8$, $N_r=\{2, 3, 4\}$, and $N_s=1$, the performance of the exemplary embodiment of present invention exhibits lower complexity than the method of the related art and degrades a little. That is, while the exemplary embodiment of present invention exhibits only performance degradation of about 0.3~0.5 dB compared to the method of the related art of FIG. 7, it notably reduces complexity compared to the method of the related art.

Although some or a portion of the components described above may be embodied as program commands, it would be apparent that other portions, or other components, may only be implemented or fully implemented through the use of hardware devices, including antennas, processors, integrated circuits, displays, input devices, and the like.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus for transmitting in a multi-user multi-antenna system, the apparatus comprising:
    a precoder configured to orthogonalize a channel by removing a channel element of a corresponding terminal with respect to multiple terminals, to determine an effective channel of each terminal by decomposing the orthogonalized channel using Singular Value Decomposition (SVD), to determine a precoding matrix using the effective channel, and to map data streams of the multiple terminals to a plurality of transmit antennas using the precoding matrix, wherein, iteratively by as many times as the number of the multiple users, the precoder decomposes each channel orthogonalization matrix of the multiple terminals using the SVD, selects a terminal of a maximum singular value among the multiple terminals, and removes the channel element of the selected terminal; and
    the plurality of the transmit antennas configured to transmit the data streams of the multiple terminals.

2. The apparatus of claim 1, wherein an initial channel orthogonalization matrix of the multiple terminals is set to a channel matrix of the multiple terminals.

3. The apparatus of claim 1, wherein the precoder removes the channel element of the selected terminal based on the following equation:

$$G_k = H_k \left( I - \sum_{m=1}^{i-1} v_{p_m,1} v_{p_m,1}^* \right)$$

where I denotes a unitary matrix, $H_k$ denotes a channel matrix of a k-th terminal, and $v_{p_m,1}$ denotes a first column vector of a second unitary matrix according to the SVD on $G_k$ of the selected terminal.

4. The apparatus of claim 1, wherein the precoder removes the channel element of the selected terminal based on the following equation:

$$G_k = \left( I - \sum_{n=1}^{j-1}\sum_{m=1}^{K} v_{p_m,n} v_{p_m,n}^H - \sum_{m=1}^{i-1} v_{p_m,i} v_{p_m,i}^H \right) H_k$$

where j denotes an index of a data stream to transmit per terminal, i denotes an order of the user selection in a j-th data stream per terminal, I denotes a unitary matrix, $H_k$ denotes a channel matrix of a k-th terminal, and $v_{p_m,1}$ denotes a first column vector of a second unitary matrix according to the SVD on $G_k$ of the selected terminal.

5. The apparatus of claim 1, wherein the effective channel of each terminal is determined based on the following equation:

$$\tilde{h}_i = u^*_{p_i,1} H_{p_i}$$

where $\tilde{h}_i$ denotes an effective channel of an i-th selected terminal, u denotes a first column vector of a first unitary matrix of the i-th selected terminal, and $H_{p_i}$ denotes a channel matrix of the i-th terminal.

6. The apparatus of claim 1, wherein the precoder determines a first precoding matrix based on the effective channel of the multiple terminals, determines a postcoding vector using the first precoding matrix, and determines a second precoding matrix of the multiple users using the postcoding vector.

7. The apparatus of claim 6, wherein the first precoding matrix $\tilde{T}$ is given by the following equation:

$$\tilde{T} = \tilde{H}^* (\tilde{H}\tilde{H}^*)^{-1},$$

the postcoding vector is given by the following equations:

$$Z = \lfloor (r^*_1 H_1)^T \ldots (r^*_K H_K)^T \rfloor$$

$$r^*_{p_k} = H_{p_k} \tilde{T}_k, \text{ and}$$

the second precoding matrix of the multiple terminals is given by the following equation:

$$T = Z^* (ZZ^*)^{-1}$$

where $\tilde{H} = [\tilde{h}_1^T \ldots \tilde{h}_K^T]^T$, $\tilde{h}_i$ denotes the effective channel of the i-th selected terminal, $r_{p_k}$ denotes a postcoding vector of the k-th selected terminal, and $\tilde{T}_k$ the first precoding matrix normalized.

8. A method for transmitting in a multi-user multi-antenna system, the method comprising:
    orthogonalizing a channel by removing a channel element of a corresponding terminal with respect to multiple terminals, wherein the orthagonalizing comprises, iteratively by as many times as the number of the multiple terminals:
        decomposing each channel orthogonalization matrix of the multiple terminals using the SVD,
        selecting a terminal of the greatest singular value from the multiple terminals, and
        removing the channel element of the selected terminal;
    determining an effective channel of each terminal by decomposing the orthogonalized channel using Singular Value Decomposition (SVD);
    determining a precoding matrix using the effective channel;
    mapping data streams of the multiple terminals to a plurality of transmit antennas using the precoding matrix; and
    transmitting the data streams of the multiple terminals.

9. The method of claim 8, wherein an initial channel orthogonalization matrix of the multiple terminals is set to a channel matrix of the multiple terminals.

10. The method of claim 8, wherein the channel element of the selected terminal is removed based on the following equation:

$$G_k = H_k \left( I - \sum_{m=1}^{i-1} v_{P_m,1} v_{P_m,1}^* \right)$$

where I denotes a unitary matrix, $H_k$ denotes a channel matrix of a k-th terminal, and $v_{P_n,1}$ denotes a first column vector of a second unitary matrix according to the SVD on $G_k$ of the selected terminal.

11. The method of claim 8, wherein the channel element of the selected terminal is removed based on the following equation:

$$G_k = \left( I - \sum_{n=1}^{j-1} \sum_{m=1}^{K} v_{P_m,n} v_{P_m,n}^H - \sum_{m=1}^{i-1} v_{P_m,i} v_{P_m,i}^H \right) H_k$$

where j denotes an index of a data stream to transmit per terminal, i denotes an order of the user selection in a j-th data stream per terminal, I denotes a unitary matrix, $H_k$ denotes a channel matrix of a k-th terminal, and $v_{P_n,1}$ denotes a first column vector of a second unitary matrix according to the SVD on $G_k$ of the selected terminal.

12. The method of claim 8, wherein the effective channel of each terminal is determined based on the following equation:

$$\tilde{h}_i = u^*_{P_i,1} H_{P_i}$$

where $\tilde{h}_i$ denotes an effective channel of an i-th selected terminal, $u_{P_i,1}$ denotes a first column vector of a first unitary matrix of the i-th selected terminal, and $H_{P_i}$ denotes a channel matrix of the i-th terminal.

13. The method of claim 8, wherein the determining of the precoding matrix using the effective channel comprises:
determining a first precoding matrix based on the effective channel of the multiple terminals;
determining a postcoding vector using the first precoding matrix; and
determining a second precoding matrix of the multiple users using the postcoding vector.

14. The method of claim 13, wherein the first precoding matrix $\tilde{T}$ is given by the following equation:

$$\tilde{T} = \tilde{H}^* (\tilde{H}\tilde{H}^*)^{-1},$$

the postcoding vector is given by the following equations:

$$Z = [r^*_1 H_1)^T \ldots (r^*_K H_K)^t]$$

$r^*_{p_k} = H_{p_k} \tilde{T}_k$, and the second precoding matrix of the multiple terminals is given by the following equation:

$$\tilde{T} = Z^* (ZZ^*)^{-1}$$

where $\tilde{H} = [\tilde{h}_1^T \ldots \tilde{h}_K^T]^T$, $\tilde{h}_i$ denotes the effective channel of the i-th selected terminal, $r_{p_k}$ denotes a postcoding vector of the k-th selected terminal, and $\tilde{T}_k$ denotes the first precoding matrix normalized.

15. An apparatus for receiving in a multi-user multi-antenna system, the apparatus comprising:
a plurality of receive antennas for receiving data streams of multiple terminals; and
a postcoder for orthogonalizing a channel by removing a channel element of a corresponding terminal with respect to the multiple terminals, for determining an effective channel of each terminal by decomposing the orthogonalized channel using Singular Value Decomposition (SVD), for determining a postcoding matrix using the effective channel, and for dividing data streams of the multiple terminals using the postcoding matrix,
wherein the postcoder, iteratively by as many times as the number of the multiple users, decomposes each channel orthogonalization matrix of the multiple terminals using the SVD, selects a terminal of the greatest singular value among the multiple terminals, and removes the channel element of the selected terminal.

16. The apparatus of claim 15, wherein the effective channel of each terminal is determined based on the following equation:

$$\tilde{h}_i = u^*_{P_i,1} H_{P_i}$$

where $\tilde{h}_i$ denotes an effective channel of an i-th selected terminal, $u_{P_i,1}$ denotes a first column vector of a first unitary matrix of the i-th selected terminal, and $H_{P_i}$ denotes a channel matrix of the i-th terminal.

17. A method for receiving in a multi-user multi-antenna system, the method comprising:
receiving data streams of multiple terminals;
orthogonalizing a channel by removing a channel element of a corresponding terminal with respect to the multiple terminals, wherein the orthogonalizing comprises, iteratively by as many times as the number of the multiple users:
decomposing each channel orthogonalization matrix of the multiple terminals using the SVD,
selecting a terminal of the greatest singular value among the multiple terminals, and
removing the channel element of the selected terminal;
determining an effective channel of each terminal by decomposing the orthogonalized channel using Singular Value Decomposition (SVD);
determining a postcoding matrix using the effective channel; and
dividing data streams of the multiple terminals using the postcoding matrix.

18. The method of claim 17, wherein the effective channel of each terminal is determined based on the following equation:

$$\tilde{h}_i = u^*_{P_i,1} H_{P_i}$$

where $\tilde{h}_i$ denotes an effective channel of an i-th selected terminal, $u_{P_i,1}$ denotes a first column vector of a first unitary matrix of the i-th selected terminal, and $H_{P_i}$ denotes a channel matrix of the i-th terminal.

19. The apparatus of claim 1, wherein decomposing the orthogonalized channel using SVD includes decomposing into a first unitary matrix, a diagonal matrix, and a second unitary matrix.

20. The method of claim 8, wherein decomposing each channel orthogonalization matrix of the multiple terminals using SVD includes decomposing into a first unitary matrix, a diagonal matrix, and a second unitary matrix.

21. The apparatus of claim 15, wherein decomposing the orthogonalized channel using SVD includes decomposing into a first unitary matrix, a diagonal matrix, and a second unitary matrix.

22. The method of claim 17, wherein decomposing each channel orthogonalization matrix of the multiple terminals using SVD includes decomposing into a first unitary matrix, a diagonal matrix, and a second unitary matrix.

* * * * *